No. 686,481. Patented Nov. 12, 1901.
C. M. SHAFER.
TRAP.
(Application filed July 29, 1901.)
(No Model.)

Witnesses:
James L. Wehn
J. L. Trefallen, Jr.

Inventor:
Charles M. Shafer.
By J. N. Cooke
Attorney.

THE NORRIS PETERS CO., PHOTO-LITHO., WASHINGTON, D. C.

UNITED STATES PATENT OFFICE.

CHARLES M. SHAFER, OF McDONALD, PENNSYLVANIA, ASSIGNOR OF ONE-HALF TO JOSEPH VOYE, SR., OF McDONALD, PENNSYLVANIA.

TRAP.

SPECIFICATION forming part of Letters Patent No. 686,481, dated November 12, 1901.

Application filed July 29, 1901. Serial No. 70,015. (No model.)

*To all whom it may concern:*

Be it known that I, CHARLES M. SHAFER, a resident of McDonald, in the county of Washington and State of Pennsylvania, have invented a new and useful Improvement in Traps; and I do hereby declare the following to be a full, clear, and exact description thereof.

My invention relates to traps, and has special reference to animal-traps for exterminating rats, mice, &c., as well as nocturnal insects.

The object of my invention is to provide a cheap and simple electrically-operated trap which will be capable of access from any direction, so that when the animal comes in contact with certain parts of the device the circuit will be closed and the entire current pass through the animal to instantly kill the same.

My invention consists, generally stated, in the novel arrangement, construction, and combination of parts as hereinafter more specifically set forth and described, and particularly pointed out in the claims.

To enable others skilled in the art to which my invention appertains to construct and use the trap, I will describe the same more fully, referring to the accompanying drawings, in which—

Figure 1:
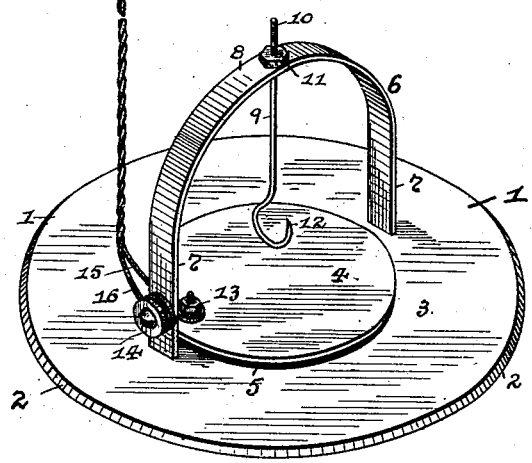
Figure 2:
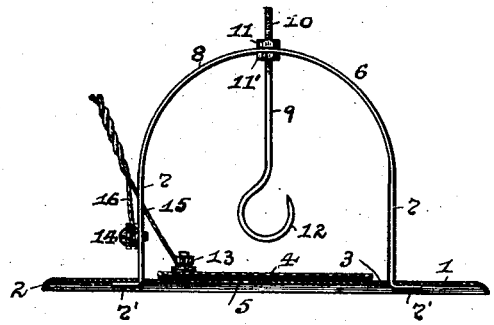

Figure 1 is a perspective view of my improved trap, and Fig. 2 is a section of the same.

Like symbols of reference herein indicate like parts in each of the figures of the drawings.

The primary platform or base 1 of the trap is preferably formed of sheet metal and of circular shape, being provided with a downwardly-projecting flange 2 around its periphery for supporting the trap upon the floor or other surface where it is to be placed.

Fitting upon the upper surface 3 of the base 1 is an auxiliary base or plate 4, preferably formed of sheet metal and circular in shape, this plate 4 being of smaller size than the base 1 and having suitable insulating material 5 placed between such base 1 and plate 4. Extending over the plate 4 is the standard 6, which is also preferably formed of sheet metal and of semicircular shape. This standard 6 is secured to the base 1 beyond the plate 4 by means of its vertical portions 7, the ends 7' of which extend through said base 1 and are bent under and against said base and soldered thereto.

Extending down from the central portion 8 of the standard 6 is the bait-holder 9, which is preferably formed of wire and has a threaded upper end 10, with which jam-nuts 11 and 11' on each side of the central portion 8 of the standard 6 are adapted to engage, while the lower end of the bait-holder is bent to form the hook 12 for holding the bait thereon.

Mounted on the plate 4 and at one side thereof is the binding-post 13, and mounted on the vertical portion 7 of the standard 6 adjacent thereto is the binding-post 14, and to these binding-posts 13 and 14 wires 15 and 16 are connected, which are also connected to a plug 17, adapted to be placed in communication with a socket 18, used in connection with an electric light.

The use and operation of my improved trap are as follows: When it is desired to use the trap, the base 1 carrying its connected parts is placed upon the floor of the apartment or other surface, when the wires 15 and 16, leading from the plug 17, connected to the electric-light socket 18, can be connected to the binding-posts 13 and 14 in order to provide an open circuit. The trap being baited by any suitable food connected to the hook 12 of the bait-holder 9, the trap is ready for operation, and when the animal contacts with the platform 1 and plate 4 in grasping the bait on the hook 12 of holder 9 the circuit will be closed and the animal will be electrocuted by the entire current passing from the electric-light socket through its body.

It will be obvious that the base or platform 1 and bait-holder 9 can be approached by animals or insects from all directions, and the device presents no apparatus which would tend to frighten the animals or insects.

The trap is cheap and simple in its construction and operation, and a number of animals and insects can be electrocuted at a time and rapidly, while the jam-nuts 11 and 11' on the bait-holder 9 permit such holder to be adjusted at any height for the bait for different creatures or different sizes and kinds of bait.

The wires 15 and 16 can lead from the trap to any suitable generator of electricity—such as, for example, a battery—and various other modifications in the construction, position, and design of the various parts may be resorted to without departing from the spirit of the invention or sacrificing any of its advantages.

What I claim as my invention, and desire to secure by Letters Patent, is—

1. An electrical trap, consisting of a base or platform which is a conductor of electricity, another base or platform which is also a conductor of electricity, insulating material between said bases or platforms, a bait-holder electrically connected to the first-named base or platform, and an electric circuit, which includes a generator in connection with both bases or platforms.

2. An electrical trap, consisting of a base or platform which is a conductor of electricity, another base or platform which is also a conductor of electricity, insulating material between said bases or platforms, a standard connected to said first-named base or platform and extending over the second base or platform, a bait-holder connected to said standard and extending down adjacent to said second base or platform, and an electric circuit, which includes a generator connected to said bases or platforms.

3. An electrical trap, consisting of a base or platform which is a conductor of electricity, another base or platform which is also a conductor of electricity, insulating material between said bases or platforms, a standard extending over said second base or platform provided with vertical portions connected to said first-named base or platform, a bait-holder connected to said standard and extending down adjacent to said second base or platform, and an electric circuit, which includes a generator connected to said second base or platform and to one of the vertical portions of said standard.

4. An electrical trap, consisting of a base or platform which is a conductor of electricity, another base or platform which is also a conductor of electricity, insulating material between said bases or platforms, a bait-holder electrically connected to the first-named base or platform, an electric circuit, which includes a generator in connection with both bases or platforms, and means for raising and lowering said bait-holder.

5. An electrical trap, consisting of a base or platform which is a conductor of electricity, another base or platform which is also a conductor of electricity, insulating material between said bases or platforms, a standard connected to said first-named base or platform and extending over the second base or platform, a bait-holder connected to said standard and extending down therefrom adjacent to the second base or platform, an electric circuit, which includes a generator in connection with both bases or platforms, and jam-nuts engaging with said bait-holder and standard to permit said bait-holder to be raised or lowered to its desired position.

In testimony whereof I, the said CHARLES M. SHAFER, have hereunto set my hand.

CHARLES M. SHAFER.

Witnesses:
A. VALENTOUR,
JOHN CATRAIN.